(12) United States Patent
Javidi et al.

(10) Patent No.: US 9,785,789 B2
(45) Date of Patent: Oct. 10, 2017

(54) METHOD AND SYSTEM FOR VERIFICATION AND AUTHENTICATION USING OPTICALLY ENCODED QR CODES

(71) Applicant: University of Connecticut, Farmington, CT (US)

(72) Inventors: Bahram Javidi, Storrs, CT (US);
Adam Markman, Storrs, CT (US);
Mohammad (Mark) Tehranipoor, Storrs, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 14/681,888

(22) Filed: Apr. 8, 2015

(65) Prior Publication Data
US 2015/0295711 A1    Oct. 15, 2015

Related U.S. Application Data

(60) Provisional application No. 61/977,531, filed on Apr. 9, 2014.

(51) Int. Cl.
| | |
|---|---|
| G06F 21/62 | (2013.01) |
| G09C 5/00 | (2006.01) |
| H04L 9/32 | (2006.01) |
| H04K 1/00 | (2006.01) |
| G06F 21/36 | (2013.01) |

(52) U.S. Cl.
CPC .......... *G06F 21/6218* (2013.01); *G06F 21/36* (2013.01); *G09C 5/00* (2013.01); *H04K 1/006* (2013.01); *H04L 9/3226* (2013.01)

(58) Field of Classification Search
CPC ....... G06F 21/6218; G06F 21/36; G09C 5/00; H04K 1/006; H04K 3/00; H04L 9/3226
See application file for complete search history.

(56) References Cited

U.S. PATENT DOCUMENTS

| | | | |
|---|---|---|---|
| 8,272,562 B2 | 9/2012 | Ziegler | |
| 2002/0179717 A1* | 12/2002 | Cummings | G06K 7/14 235/462.25 |
| 2007/0083535 A1* | 4/2007 | Zilliacus | G06F 17/30905 |

(Continued)

OTHER PUBLICATIONS

Perez-Cabre, Elisabet et al., Photon-counting double-random-phase encoding for secure image verification and retrieval, Aug. 2012, Polytechnic University of Catalonica, Journal of Optics 14(9).*

(Continued)

*Primary Examiner* — Luu Pham
*Assistant Examiner* — Harvey Cohen
(74) *Attorney, Agent, or Firm* — McCarter & English, LLP

(57) ABSTRACT

An optical security method for object authentication using photon-counting encryption implemented with phase encoded QR codes. By combining the full phase double-random-phase encryption with photon-counting imaging method and applying an iterative Huffman coding technique, encryption and compression of an image containing primary information about the object is achieved. This data can then be stored inside of an optically phase-encoded QR code for robust read out, decryption, and authentication. The optically encoded QR code is verified by examining the speckle signature of the optical masks using statistical analysis.

17 Claims, 10 Drawing Sheets

(56) References Cited

U.S. PATENT DOCUMENTS

| | | | | |
|---|---|---|---|---|
| 2008/0317200 | A1* | 12/2008 | Lecomte | A61B 6/032 378/19 |
| 2011/0053693 | A1* | 3/2011 | Wright | A63F 13/10 463/42 |
| 2013/0015236 | A1* | 1/2013 | Porter | G06F 21/645 235/375 |
| 2013/0221084 | A1* | 8/2013 | Doss | H04W 12/06 235/375 |
| 2014/0317713 | A1* | 10/2014 | Gadotti | H04L 63/0853 726/7 |
| 2015/0347889 | A1* | 12/2015 | Nosaka | G06K 7/10 726/7 |
| 2015/0356306 | A1* | 12/2015 | Carter | G06F 21/64 380/246 |

OTHER PUBLICATIONS

Huffman, David A., A Method for the Construction of Minimum-Redundancy Codes, Proceedings of the IRE (IEEE, 1952), Sep. 1952, pp. 1098-1101.*

Towghi, N. et al., Fully phase encryption image processor, J. Opt. Soc. Am. A 16, pp. 1915-1927 (1999).*

Dainty, J. C., The Statistics of Speckle Patterns, (1976).*

Cho et al.,3D passiveIntegralImagingUsingCompressiveSensing, Nov. 2012, Optical Society of America, vol. 20. No. 24, pp. 26624-26635.*

Alfalou et al., Optical Image Compression and Encryption Methods, Oct. 28, 2009, Advances in Optics and Photonics 1, vol. 10, pp. 589-636.*

Shan et al,Applicationof QR TwoDimensionalCodeTechnology inCreditsCertififcationSystem,Dec. 2013,ACM ICCC '13: Proceedings of the Second International Conference on Innovative Computing and Cloud Computing.*

Mogensen et al.,Phase-OnlyOpticalEncryption,Apr. 2000, OpticalSocietyofAmerica, vol. 25 No. 8, pp. 566-568.*

Towghi, N. et al., Fully phase encryption image processor, J. Opt. Soc. Am. A 16, 1999, pp. 1915-1927.*

Perez-Cabre, Elisabet et al., Photon-counting double-random-phase encoding, Aug. 2012, Polytechnic University of Catalonica, Journal of Optics 14.*

Huffman, David A., A Method for the Construction of Minimum-Redundancy Codes, Proceedings of the IRE (IEEE, 1952), Sep. 1952, pp. 1098-1102.*

Matoba,OpticalTechniquesforInformationSecurity,Jun. 2009, IEEE vol. 97 No. 6p.*

Huffman, D., A Method for the Construction of Minimum-Redundancy Codes, Proceedings of the IRE (IEEE,1952), pp. 1098-1101.

Dainty, J. C., The Statistics of Speckle Patterns (1976).

Javidi, B., Nonlinear joint power spectrum based optical correlation, Appl. Opt. 28, pp. 2358-2367 (1989).

Dubois, F., Automatic spatial frequency selection algorithm for pattern recognition by correlation, Appl. Opt. 32, pp. 4365-4371 (1993).

Refregier, P. et al., Optical image encryption based on input plane and Fourier plane random encoding, Opt. Lett. 20, pp. 767-769 (1995).

Goudail, F. et al., Influence of a perturbation in a double phase-encoding system, J. Opt. Soc. Am. A 15, pp. 2629-2638 (1998).

Towghi, N. et al., Fully phase encrypted image processor, J. Opt. Soc. Am. A 16, pp. 1915-1927 (1999).

Li, Y. et al., Security and encryption optical systems based on a correlator with significant output images, Appl. Opt. 39, pp. 5295-5301 (2000).

Matoba, O. et al., Encrypted optical memory systems based on multidimensional keys for secure data storage and communications, IEEE Circ. Dev. Mag. 16, pp. 8-15 (2000).

Tajahuerce, Enrique, and Bahram Javidi. "Encrypting three-dimensional information with digital holography." *Applied Optics* 39.35 (2000): 6595-6601.

Ohbuchi, E. et al., Barcode readers using the camera device in mobile phones, in Proceedings of IEEE 2004 International Conference on Cyberworlds, M. Nakajima , ed. (IEEE, 2004), pp. 260-265.

Carnicer, A. et al., Vulnerability to chosen-cyphertext attacks of optical encryption schemes based on double random phase keys, Opt. Lett. 30, pp. 1644-1646 (2005).

Suzuki, H. et al., Experimental evaluation of fingerprint verification system based on double random phase encoding, Opt. Express 14, pp. 1755-1766 (2006).

Frauel, Y. et al., Resistance of the double random phase encryption against various attacks, Opt. Express 15,pp. 10253-10265 (2007).

Alfalou, A. et al., Optical image compression and encryption methods, Adv. Opt. Photon. 1, pp. 589-636 (2009).

Matoba, O. et al., Optical techniques for information security, Proc. IEEE 97, pp. 1128-1148 (2009).

Pérez-Cabré, E. et al., Information authentication using photon-counting double-random-phase encrypted images, Opt. Lett. 36, pp. 22-24 (2011).

Barrera, J. et al., Optical encryption and QR codes: Secure and noise-free information retrieval, Opt. Express 21,pp. 5373-5378 (2013).

Chen, W. et al., Phase-modulated optical system with sparse representation for information encoding and authentication, IEEE Photon. J. 5, 6900113 (2013).

Cho, Myungjin, and Bahram Javidi. "Three-dimensional photon counting double-random-phase encryption." *Optics letters* 38.17 (2013): 3198-3201.

Chen, Wen, Bahram Javidi, and Xudong Chen. "Advances in optical security systems." *Advances in Optics and Photonics* 6.2 (2014): 120-155.

Markman, Adam, and Bahram Javidi. "Full-phase photon-counting double-random-phase encryption." *JOSA A* 31.2 (2014): 394-403.

Markman, A., Bahram Javidi, and Mohammad Tehranipoor. "Photon-counting security tagging and verification using optically encoded QR codes." *Photonics Journal*, IEEE 6.1 (2014): 1-9.

U.S. Appl. No. 61/977,531, filed Apr. 9, 2014.

* cited by examiner

| Features | atmel at89s8253 |
|---|---|

- Compatible with MCS®-51 products
- 12K Bytes of In-system Programmable (ISP) Flash Program Memory
  - SPI Serial Interface for Program Downloading
  - Endurance: 10,000 Write/Erase Cycles
- 2K Bytes EEPROM Data Memory
  - Endurance: 100,000 Write/Erase Cycles
- 64-byte User Signature Array
- 2.7V to 5.5V Operating Range
- Fully Static Operation: 0 Hz to 24 MHz (in x1 and x2 Modes)
- Three-level Program Memory Lock
- 256 x 8-bit Internal RAM
- 32 Programmable I/O lines
- Three 16-bit Timer/Counters
- Nine Interrupt Sources
- Enhanced UART Serial Port With Framing Error Detection and Automatic Address Recognition
- Enhanced SPI (Double Write/Read Buffered) Serial Interface
- Low-power Idle and Power-down Modes
- Interrupt Recovery From Power-down Mode
- Programmable Watchdog Timer
- Dual Data Pointer
- Power-off Flag
- Flexible ISP Programming (Byte and Page Modes)
  - Page Mode: 64Bytes/Page for Code Memory, 32 Bytes/Page for Data Memory
- Four-level Enhanced Interrupt Controller
- Programmable and Fuseable x2 Clock Option
- Internal Power-on Reset
- 42-pin PDIP Package Option For Reduced EMC Emission
- Green (Pb/Halide-free) Packaging Option Pinout:

```
(T2)    P1.0  [ 1    40 ]  VCC
(T2 EX) P1.1  [ 2    39 ]  P0.0 (AD0)
        P1.2  [ 3    38 ]  P0.1 (AD1)
        P1.3  [ 4    37 ]  P0.2 (AD2)
(SS)    P1.4  [ 5    36 ]  P0.3 (AD3)
(MOSI)  P1.5  [ 6    35 ]  P0.4 (AD4)
(MISO)  P1.6  [ 7    34 ]  P0.5 (AD5)
(SCK)   P1.7  [ 8    33 ]  P0.6 (AD6)
        RST   [ 9    32 ]  P0.7 (AD7)
(RXD)   P3.0  [ 10   31 ]  EA/VPP
(TXD)   P3.1  [ 11   30 ]  ALE/PROG
(INT0)  P3.2  [ 12   29 ]  PSEN
(INT1)  P3.3  [ 13   28 ]  P2.7 (A15)
(T0)    P3.4  [ 14   27 ]  P2.6 (A14)
(T1)    P3.5  [ 15   26 ]  P2.5 (A13)
(WR)    P3.6  [ 16   25 ]  P2.4 (A12)
(RD)    P3.7  [ 17   24 ]  P2.3 (A11)
        XTAL2 [ 18   23 ]  P2.2 (A10)
        XTAL1 [ 19   22 ]  P2.1 (A9)
        GND   [ 20   21 ]  P2.0 (A8)
```

FIG. 1A

MC34063A, MC33063A
NCV33063A
1.5 A, Step-up/Down/Inventing Switching Regulators
The MCS34063A Series is a Monolithic Control Circuit Containing the Primary Functions for Dc-to-DC Converters. These Devices Consists of an Internal Temperature Compensated Reference, Comparator, Controlled Duty Cycle Oscillator with an Active Current Limit Circuit, Driver and High Current Output Switch. This Series was Specifically Designed to be Incorporated in Step-down and Step-up and Volatage-Inverting Applications with a Minimum Number of External Components. Refer to Applications Notes AN920A/D and AN954/D for Additional Design Information.

ON Semiconductor
http://onsemicon

- Operation from 3.0 V to 40 V Input
- Low Standby Current
- Current Limiting
- Output Switch Current to 1.5A
- Output Voltage Adjustable
- Frequency Operation to 100 kHz
- Precision 2% Reference

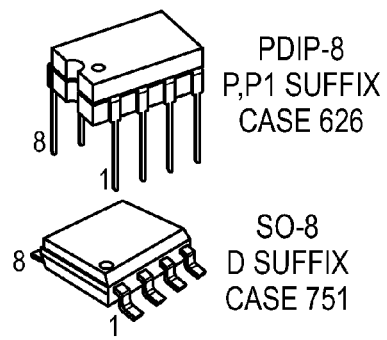

PDIP-8
P,P1 SUFFIX
CASE 626

SO-8
D SUFFIX
CASE 751

PIN CONNECTIONS

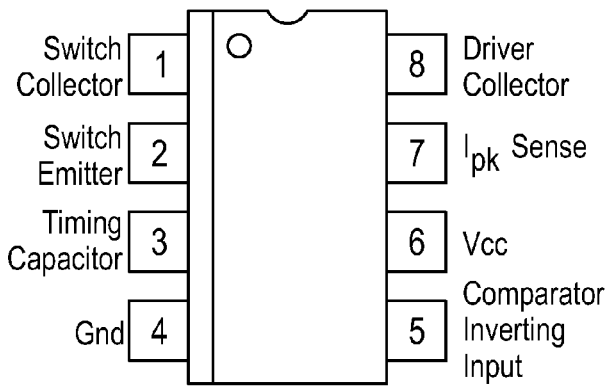

| Pin | |
|---|---|
| 1 | Switch Collector |
| 2 | Switch Emitter |
| 3 | Timing Capacitor |
| 4 | Gnd |
| 5 | Comparator Inverting Input |
| 6 | Vcc |
| 7 | $I_{pk}$ Sense |
| 8 | Driver Collector |

ORDERING INFORMATION
See Detailed Ordering and Shipping Information in the Package Dimensions Section on Page 11 of this Data Sheet

DEVICE MARKING INFORMATION
See General Marking Information in the Device Marking Section on Page 11 of this Data Sheet

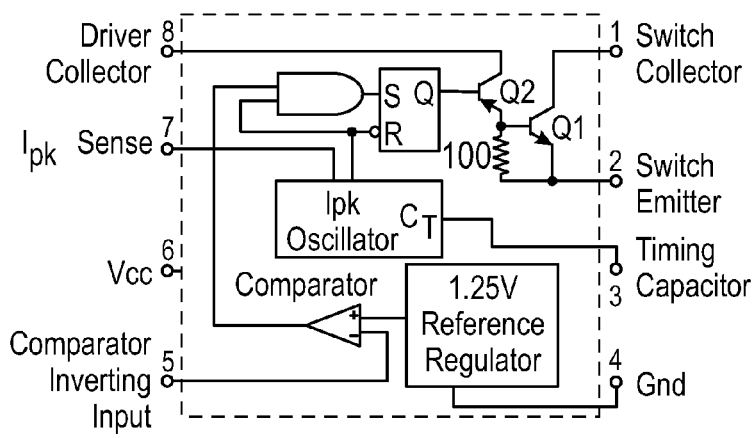

This Device Contains 51 Active Transistors
Figure 1. Representative Schematic Diagram

FIG. 3B

METHOD AND SYSTEM FOR VERIFICATION AND AUTHENTICATION USING OPTICALLY ENCODED QR CODES

CROSS REFERENCE TO RELATED APPLICATIONS

This application claims priority benefit under 35 U.S.C. §119 (e) from provisional patent application Ser. No. 61/977,531, filed on Apr. 9, 2014. The entire content of the foregoing provisional patent application is incorporated herein by reference.

FIELD OF INVENTION

The disclosure contained herein is in the general field of information security and hardware security accomplished through the use of optical techniques.

BACKGROUND OF THE INVENTION

There is currently widespread use of methods and products, product samples, containers, or packaging that include interactive quick response or scannable codes linked to Internet Uniform (or Universal) Resource Locator (URL) for providing contact information, promotional or cross promotional product samples or products, containers, and/or packaging, where the product, product sample, container, or packaging has any type of associated scannable internet quick response URL code, quick response MS TAG or quick response QR Code that delivers interactive information, education and/or entertainment experience for the public, retailers or other entities when the product or package is scanned with a smart phone, internet tablet, computer, netbook, or other device. This type of technology and aspects of the current state of the related art are described, by way of example, in U.S. Pat. No. 8,272,562 to Ziegler.

Information security with optical techniques has been widely investigated [1]-[14]. Many variations of random phase encoding for security and encryption have been proposed [15]-[31]. Optical techniques in security provide many advantages, including the ability to secure data with multi-dimensional keys, such as wavelength [3], polarization[4], and placing the keys in the Fresnel domain [5]. Recently, photon-counting imaging has been integrated with the double-random-phase encryption for optical security [25]. The motivation for using photon-counting is that the integration of photon-counting imaging generates an additional layer of complexity that enhances the security of the system against an attacker. Photon-counting creates a photon-limited encrypted image is very sparse compared with a conventional encrypted data. Unlike a conventional decryption system, when photon-counting is used, the decrypted data is not recognizable by visual inspection. As a result it is more robust to attacks because an attacker cannot recognize the decrypted image due to the sparse encrypted data.

In addition, photon-counting imaging follows the Poisson distribution which is a nonlinear transformation unlike the conventional double random phase encryption which is a linear encoding. The nonlinear transformation is also advantageous in making the system more robust against attacks.

Currently, it is not possible to see what is stored in the QR code prior to scanning the QR code. As the popularity of QR codes increases, there will be more focus on attacking or compromising QR codes. Many times, this may be done by storing a uniform resource locator (URL) that redirects the scanning device to a malicious website. The disclosed method and system allows for an image to be stored in a QR code and read without the need for internet access.

More particularly, it is currently possible for an attacker to duplicate a QR code placed on an object, store malicious information inside the QR code, and then replace the original QR code. Methods for authenticating a QR code have not been disclosed.

Currently, it is also not possible to insert an image into a QR code due to data size restrictions and the limited resolution of commercial Smartphones when scanning the QR code.

These and others limitations are addressed and overcome according to the present disclosure.

SUMMARY OF THE INVENTION

The present disclosure relates to a method and system for object authentication using photon-counting encryption implemented with phase encoded QR codes for applications to integrated circuits [IC] to enhance inspection and anti-counterfeiting functionalities. By combining the full-phase double-random-phase encryption with photon-counting imaging method and applying an iterative Huffman coding technique, the present disclosure advantageously encrypts and compresses a binary image containing primary information about the object. This data can then be stored inside an optically phase-encoded QR code for robust read out, decryption, and authentication.

In accordance with exemplary embodiments, a method for optical security, tagging and authentication is disclosed. The method may include encrypting image data. The method may also include producing photon-limited amplitude image data by applying photon-counting to the amplitude of the encrypted image data. Iterative compression of the encrypted and photon-limited amplitude image data may be employed. The method may further include storing the compressed and encrypted image data.

Scanning of the compressed and encrypted image data may be employed. The compressed and encrypted image data may be decompressed and decrypted. The method may also include authenticating the image data. Optical masks or patterns may be attached or embedded with the encrypted data for object authentication.

In some embodiments, the disclosed method includes a variety of photon-counting imaging techniques, e.g., techniques that follow the Poisson distribution. In some embodiments, the disclosed method includes a variety of synthetic and natural or physical signatures stored in the ID tag, such as signatures. A variety of encryption techniques can be used, including full-phase double-random-phase encryption. In some embodiments, the disclosed method may include one or more compression techniques and such technique(s) may be used to iteratively compress the image data, including Huffman coding. In some embodiments, the disclosed method includes a variety of optical encoding techniques for attaching or embedding optical masks containing from micron size to nano size details.

In further embodiments of the present disclosure, the disclosed method may include storing the compressed and encrypted data, and inputting the compressed and encrypted image data to an optically encoded QR code. In some embodiments, the disclosed method includes encoding the QR code with a phase mask to prevent duplication of the QR code and verifying the optically encoded QR code by examining the speckle signature of the optical masks using statistical analysis.

In some embodiments, the disclosed method includes scanning the QR code by a QR scanner. One or more keys may be used to decrypt the encrypted data. A nonlinear correlation filter image recognition algorithm may be employed to verify the decrypted image against the primary image for authentication. In some embodiments, the disclosed method includes encrypting, compressing and storing the image data in a QR code without requiring the use of the world wide web.

In accordance with further exemplary embodiments of the present disclosure, a system is provided for optical security, tagging and authentication. The system may include an encryption unit to encrypt image data using a full-phase double-random-phase encryption. The system may also include a photon-counting unit to produce photon-limited amplitude image data by applying photon-counting to amplitude of the encrypted image data. A compression unit may be incorporated to iteratively compress the photon-limited amplitude image data. A storage unit may be provided to store compressed and encrypted image data.

Exemplary embodiments of the disclosed system also include a scanning unit to scan the compressed and encrypted image data. A decompressing unit may be provided to decompress the compressed and encrypted image data. The system may also include a decrypting unit to decrypt the decompressed and encrypted image data. An authentication unit may be provided to authenticate the image data. The authentication unit may attach or embed optical masks or patterns with the encrypted data for object authentication.

In some embodiments, the compression unit can use a variety of compression techniques to iteratively compress the image data, including Huffman coding. In some embodiments, the storage unit stores the compressed and encrypted image data in an optically encoded QR code. The authentication unit may attach the optically encoded QR code to an object to be authenticated. In some embodiments, the authentication unit encodes the QR code with an optical phase mask to prevent duplication and verifies the optically encoded QR code by examining the speckle signature of the optical masks using statistical analysis. The scanning functionality may be incorporated into a mobile device. The decrypting unit may use at least one key to decrypt the encrypted data. In some embodiments, the authentication unit uses a nonlinear correlation filter image recognition algorithm to verify the decrypted image against the primary image for authentication.

Additional features and functions of the present disclosure will be apparent from the description which follows, particularly when read in conjunction with the appended figures.

BRIEF DESCRIPTION OF DRAWINGS

To assist those of ordinary skill in the art in making and using the disclosed apparatus, systems and methods, reference is made to the appended figures, wherein:

FIG. 1(a) is a 449×641 pixel binary image;

FIG. 3(b) is a 449×641 pixel binary false class image;

DETAILED DESCRIPTION OF EXEMPLARY EMBODIMENT(S)

According to the present disclosure, advantageous systems and methods for optical tagging are provided. According to exemplary systems and methods of the present disclosure, data is encrypted using a full-phase double-random-phase encryption with photon-counting, and then an iterative compression technique is applied based on Huffman coding to compress the image. The data can then be stored in a QR code and placed on the object to be authenticated. Commercial QR scanners, e.g., scanners built into Smartphones such as an iPhone or Android device, can be used to scan the QR code and capture the encrypted data. The encrypted data can then be decrypted and decompressed using the correct keys and dedicated algorithms to deal with the photon-counting nature of the data. Image recognition algorithms, such as nonlinear correlation filters, can be used to verify the decrypted image against the primary image for authentication.

QR Codes

Figure 7A:
FIG. 7(a) is an exemplary QR code with 10 characters.
Figure 7B:
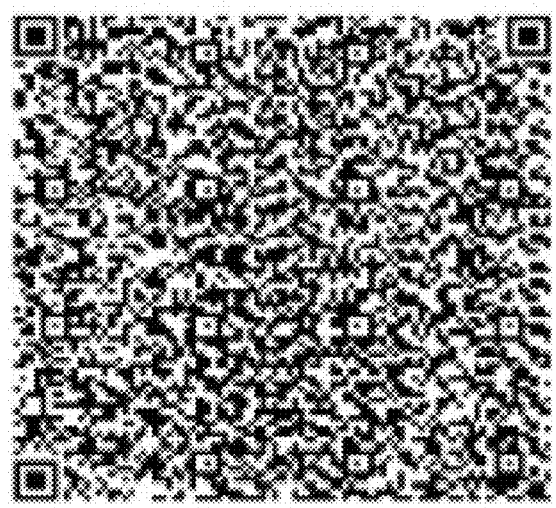
FIG. 7(b) is an exemplary QR code with over 400 characters.

A QR code is a 2 dimensional (2D) barcode created by D. Wave [33],[34]. The advantage of a QR code is that it can be scanned regardless of scanning direction or if the QR code is damaged. Online QR Code generators can be used to generate QR codes including the level of error correction and version number [41]. The QR code itself is a binary image consisting of black squares known as modules placed on a white background, shown in FIG. 7(a), where each module represents some information about the input text. The QR code can be read by a QR reader built into Smartphones [35] to retrieve the text. However, as the number of characters stored in the QR code increases, the size of the modules decreases. As a result, if too much information is stored in a QR code, as shown in FIG. 7(b), the module size will fall below the resolution limit of the camera used in Smartphones, making it difficult for the QR reader to scan.

Full-Phase Double-Random-Phase Encoding with Photon-Counting

In exemplary embodiments, the full-phase double-random-phase encryption with photon-counting (PC-DRPE)

can be used to encrypt the input image. For convenience, one-dimensional notation will be used in explaining the encryption method. To implement the encryption scheme, (x) and (υ) denote the spatial and frequency domains, respectively. In addition, f(x) is the primary input image and n(x) and b(υ) are two random noises that are uniformly distributed over the interval[0,1]. The encrypted image is generated by first phase encoding the input image yielding exp[iπ f(x)] and then multiplying the phase encoded image by the phase mask exp[i2π n(x)]. This product is then convolved with a phase mask, h(x), whose Fourier transform is exp[i2π b(v)]. The encrypted image is then denoted by equation:

$$\psi(x)=\{\exp[i\pi f(x)]\times\exp[i2\pi n(x)]\}*h(x) \quad [1],$$

where * denotes convolution and × denotes multiplication.

Photon-counting imaging [25]-[26],[39] is then applied to the amplitude of the encrypted image, |ψ(x)| (x), by limiting the number of photons arriving at each pixel. It has been shown that this process can be modeled as a Poisson distribution. Moreover, the fewer the number of photons, the sparser the scene becomes due to less photons arriving at a pixel. The number of photons arriving at pixel j can be modeled as:

$$P(l_j;\lambda_j) = \frac{|\lambda_j|^{l_i} - e^{-\lambda_j}}{l_i!}, \text{ for } \lambda_j > 0, l_i \in \{0, 1, 2, \ldots\}, \quad [2]$$

where $l_j$ is the number of photons detected at pixel j and $\lambda_j$ is the Poisson parameter defined as $N_p x_j$, where $N_p$ is the number of photons in the scene and $x_j$, is the normalized irradiance at pixel j such that $\Sigma^M_{j=1} x_j=1$ with M being the total number of pixels. Moreover, the normalized irradiance is defined as $|\psi_{ph}(x)|=|\psi(x_j)|/|\Sigma^M_{j=1}|\psi(x_j)|$, where $|\psi(x_j)|$ is the amplitude information.

The full-phase PC-DRPE encrypted image $\psi_{ph}(x)$, can then be decrypted The Fourier transform of $\psi_{ph}(x)$ is taken and multiplied by the complex conjugate of the phase mask used in the frequency domain, exp[−i2π b(v)]. The Fourier transform is then taken once more. In the full-phase PC-DRPE decryption process, the resulting product must be multiplied by the complex conjugate of the phase mask used in the spatial domain, exp[−i2π b(v)]. The final decrypted image, f(x), which is real and positive, is then found as [8], [26]:

$$|f_{ph}(x)|=|\text{Arg}\{A\exp[i\pi f_{ph}(x)]\}/\pi| \quad [3],$$

where A is the amplitude of the decrypted image, Arg is the argument function and ∥ is the modulus operator.

Rather than recover the decrypted image, a noise-like decrypted image is obtained which is difficult to visually authenticate. However, the decrypted image can be authenticated using classification algorithms, such as nonlinear-processors [36]-[38]. To authenticate the decrypted image [Eq. (3)], a number of image recognition techniques can be used. For example, a $k^{th}$ order nonlinear processor [37] may be advantageously employed for its simplicity and effectiveness. In this approach, the Fourier transforms of the decrypted image, $f_{ph}(x)$, and the input image, f(x), are first taken. The processor is implemented by the following equation:

$$c(x)=IFT\{|F_{f_{ph}}(v)F_f(v)|^k\exp[j(\phi_{f_{ph}}(v)-\phi_f(v))]\} \quad [4],$$

where IFT is the inverse Fourier transform, k is the strength of the applied nonlinearity and determines the performance features of the processor, and φ(v) is the phase information.

Combining Huffman Coding with the DRPE and QR Code

In exemplary embodiments, an iterative Huffman coding method to compress an image is used so it can be stored in a QR code, allowing a Smartphone to read the QR code.

Currently, it is not possible to insert an image into a QR code [See Appendix A for more information about QR codes] due to data size restrictions and the limited resolution of commercial Smartphones when scanning the QR code [40]. To overcome this limitation, an image is inserted into a QR code via a hyperlink: A user scans the QR code containing the hyperlink which automatically redirects the user to the image. We present an iterative Huffman coding method to compress an image so it can be stored in a QR code allowing a Smartphone to read the QR code.

In the iterative Huffman coding method, Huffman coding [32] is applied on the photon-limited amplitude data, ψ(x), for low $N_p$ [Eq. (2)] by converting the image into a 1 dimensional array. Note that each pixel is an integer value due to the Poisson distribution being a discrete distribution. The first Huffman code compression reduces the image into a series of bits. The Huffman code can then be represented as a series of integers by first padding the Huffman code with zeros to ensure the code can be separated into groups of 8 bits. Each group can then be converted to an integer; this is advantageous because the QR code is character limited.

For example, if a group of 10 pixels has corresponding values [0 1 1 0 0 2 1 4 2 1] in the image, the Huffman code is then a series of bits corresponding to the symbol 0, 1, 2, or 4. Suppose a group of 8 bits is 10110111, this can be rewritten as 183. Once there has been one iteration of Huffman coding, Huffman coding can be repeated since there will be repeated integers between 1 and 256 which range from 1 to 3 characters each. The described Huffman coding procedure can be repeated until there is a low number of characters present in the compressed data.

Once the QR code has been scanned, the data can be decompressed if both the dictionary and the length of the unpadded Huffman code, in bit form, associated with each Huffman iteration are known (allowing for the zero padding to be removed). Moreover, the data can then be successfully decrypted if the phase mask keys used in the full-phase PC-DRPE are known.

Figure 1B:
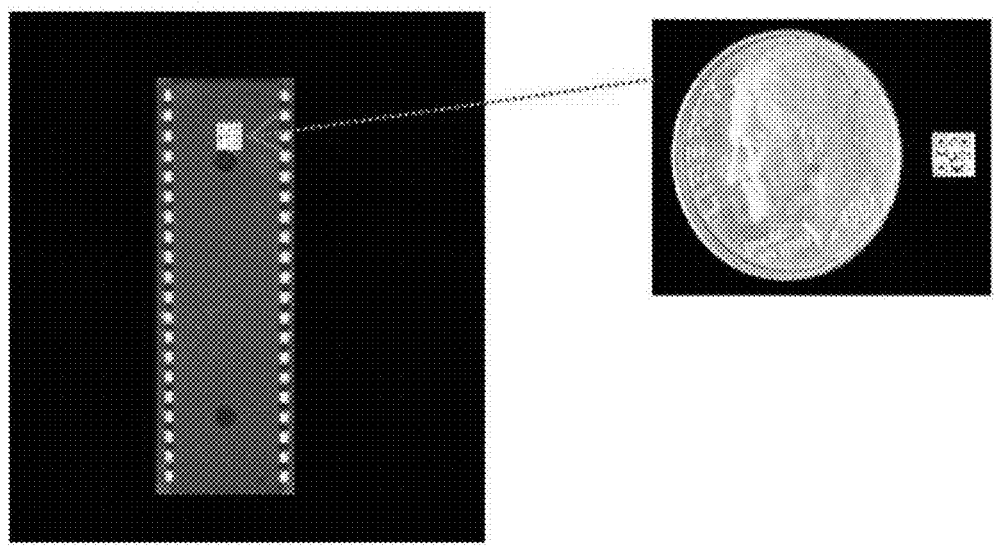
FIG. 1(b) is a 3.15 mm×3.15 mm QR code storing the encrypted and compressed image shown in FIG. 1(a) placed on a 14.5 mm×52.1 mm integrated circuit (IC)
Figure 2A:
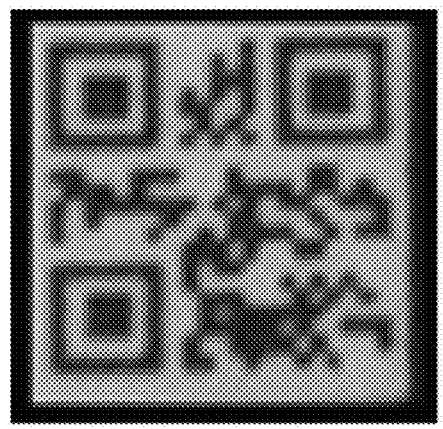
FIG. 2(a) is an enlarged QR code taken using the iPhone 4 camera.
Figure 2B:
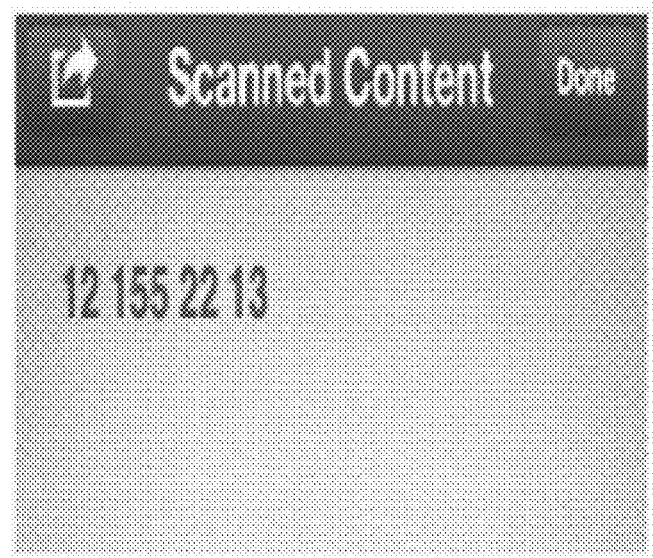
FIG. 2(b) is a scanned QR Code depicting exemplary encrypted and compressed data using an iPhone SCAN Application.

With reference to the figures, FIG. 1(a) depicts a 449×641 pixel binary image and FIG. 1(b) depicts a 3.15 mm×3.15 mm QR code, placed on a 14.5 mm×52.1 mm integrated circuit (IC). The QR Code is also shown next to a dime in FIG. 1(b). FIG. 2(a) shows an enlarged QR Code obtained from the QR code shown in FIG. 1(b) using an iPhone 4 camera. FIG. 2(b) depicts the scanned QR code which reveals the compressed and encrypted (for Np=500) data using the iPhone SCAN application.

Figure 3A:
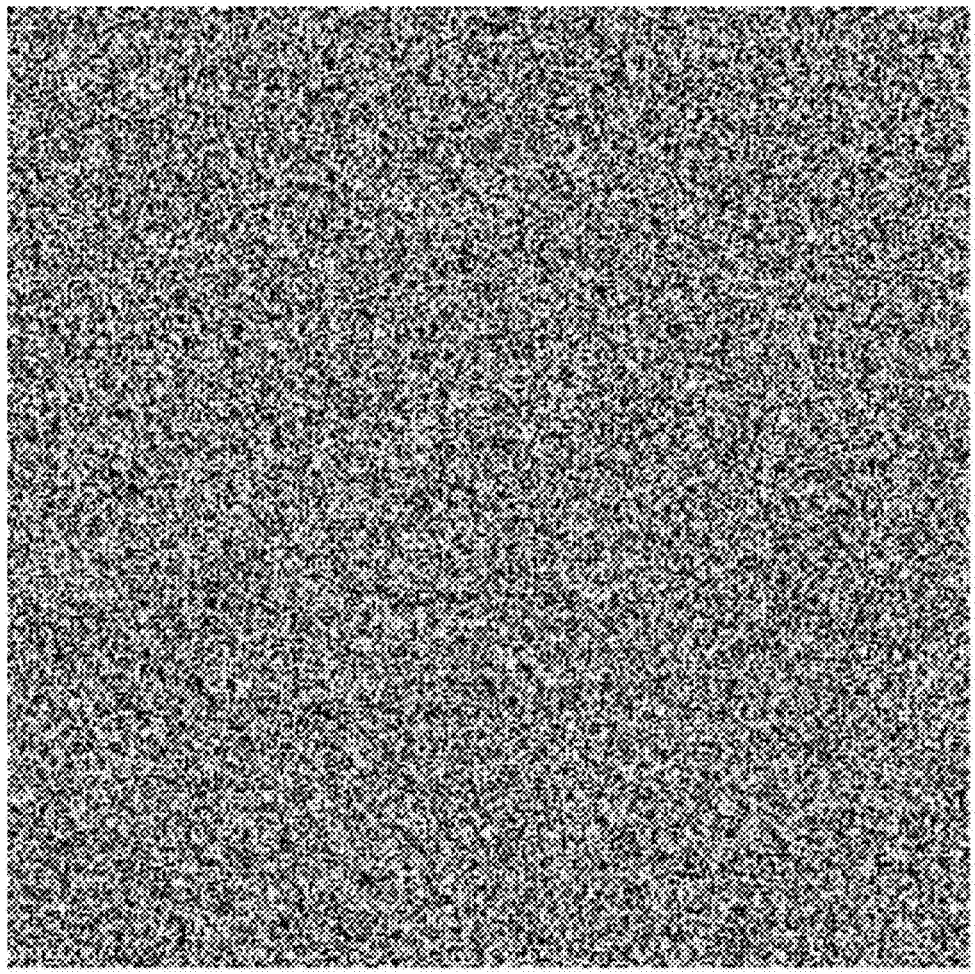
FIG. 3(a) is a decrypted image obtained from the full-phase PC-DRPE using the image shown in FIG. 3(a) as the input image (true class object)
Figure 3C:
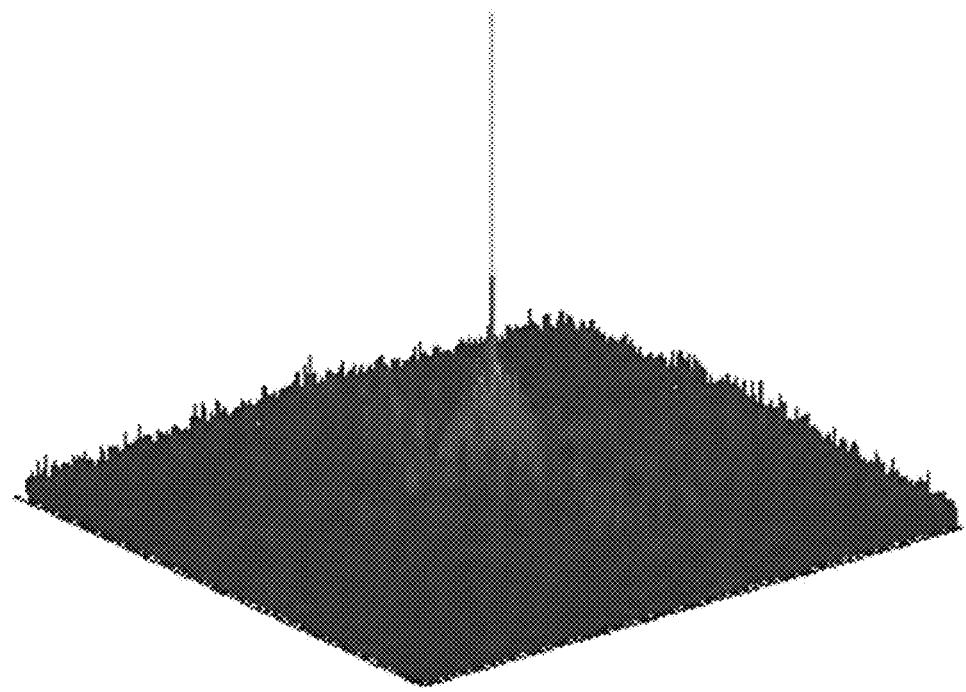
FIG. 3(c) is an output of the kth order nonlinear filter between the true class decrypted image and the true class object with k=0.3 normalized to 1.
Figure 3D:
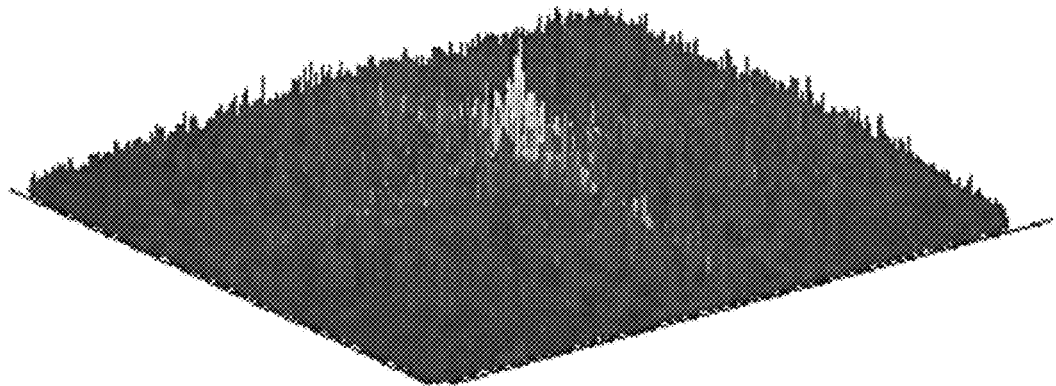
FIG. 3(d) is an output of the kth order nonlinear filter between the true class decrypted image and the false class object which has a maximum peak of 0.330 with k=0.3.

Once the data has been scanned, it can be decompressed and decrypted. With reference to FIG. 3(a), a decrypted input image is shown at Np=500. Note that it is impossible to visually authenticate the decrypted image. However, a nonlinear correlation filter [Eq. (4)] can be used to authenticate the primary image with the input image. FIG. 3(c) shows the output of the $k^{th}$ order nonlinear filter normalized to 1 with k=0.3. A distinct peak is obtained indicating that the filter recognizes the decrypted image as a true class object. FIG. 3(b) shows a 449×641 pixel false class image, g(x), that is used in the $k^{th}$ order nonlinear filter to verify that it can distinguish between true and false class objects. FIG. 3(d) shows the output of the filter using g(x) which has a maximum peak of 0.330.

Figure 4A:
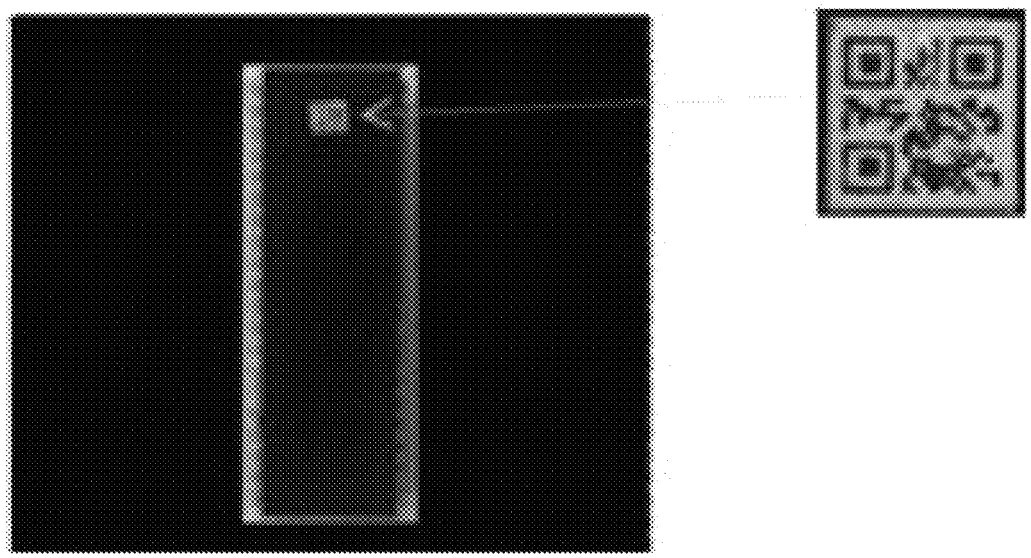
FIG. 4(a) is an exemplary QR code encoded with a random phase mask placed on an IC.
Figure 4B:
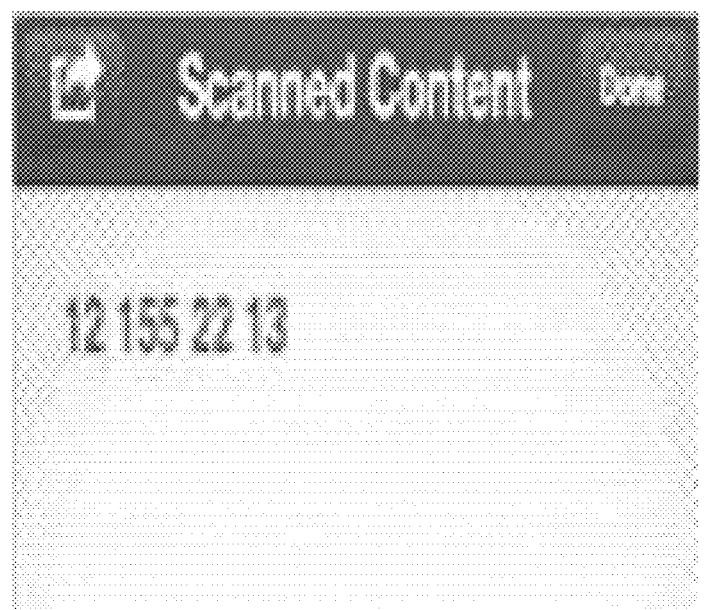
FIG. 4(b) is a scanned QR code relative to the image of FIG. 4(a)

In this exemplary embodiment, replication of the QR code is avoided. More particularly, in the exemplary embodiment, replication of the QR code is prevented by optically encoding the QR code. To do this, a phase mask is pasted on the QR code and coherent optical imaging is used to verify whether the QR code has been copied. FIG. 4(a) shows a QR code encoded with a random phase mask placed on the QR code. An advantage of a phase mask is that it is transparent, which allows the QR code located on the IC to be scanned. Note that Reed Solomon Error correction incorporated into the QR code design [33] can account for any minor physical anomalies in the QR code. FIG. 4(b) shows the enlarged QR code shown in FIG. 4(a) successfully scanned using the iPhone SCAN Application.

Figure 5:
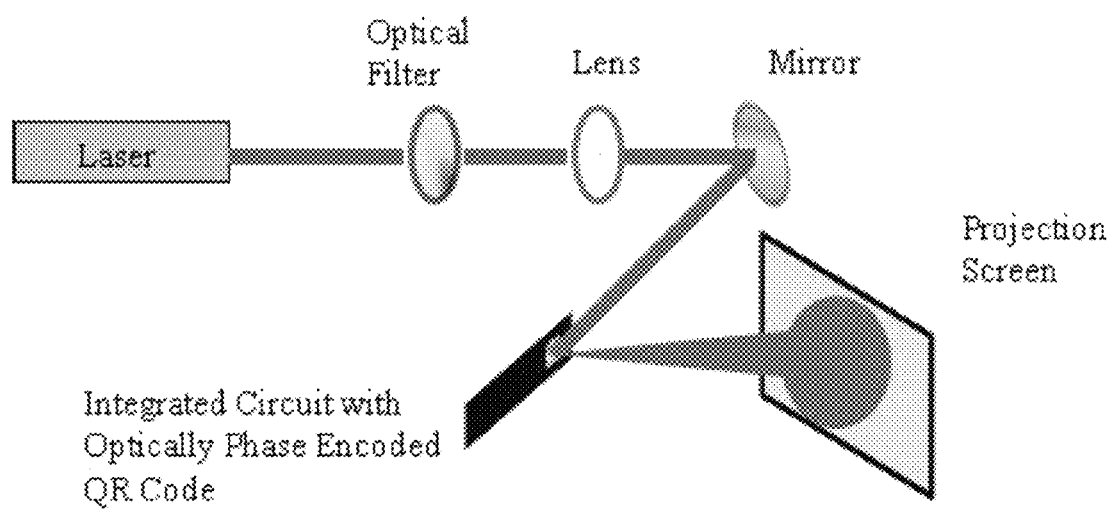
FIG. 5 is a schematic diagram showing an exemplary set-up for generating a QR code speckle pattern.

To verify that the correct phase mask is used, a laser source illuminates the QR code located on the IC chip which is covered by the phase mask. The light scatters off of the random phase mask and generates a speckle pattern which can be seen on a projection screen as shown in FIG. 5. The intensity of the speckle pattern can be recorded using a camera. Each phase mask generates a unique speckle pattern. Thus, the QR code along with the correct phase mask must be used to verify the QR code.

Figure 6A:
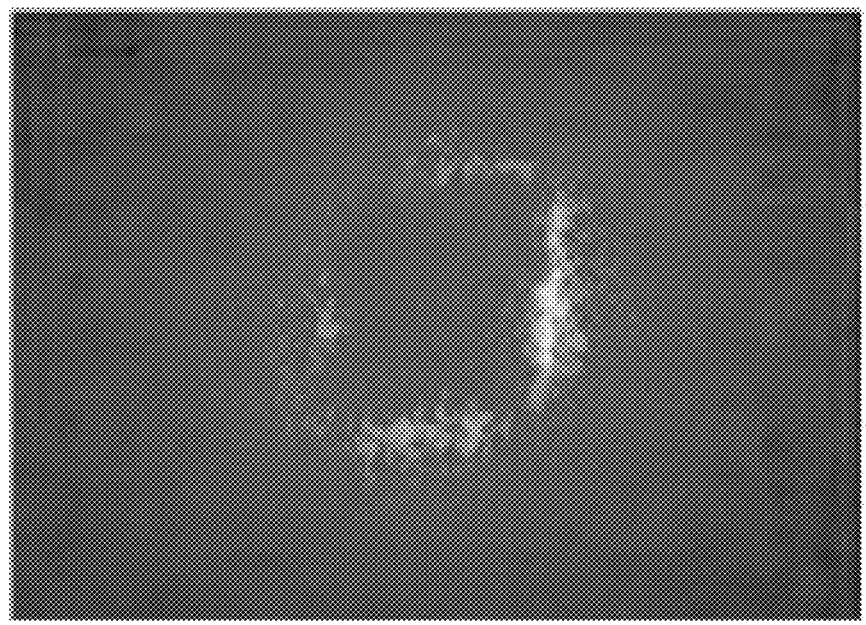
FIG. 6(a) is a speckle intensity pattern generated by a QR code without a phase mask.
Figure 6B:
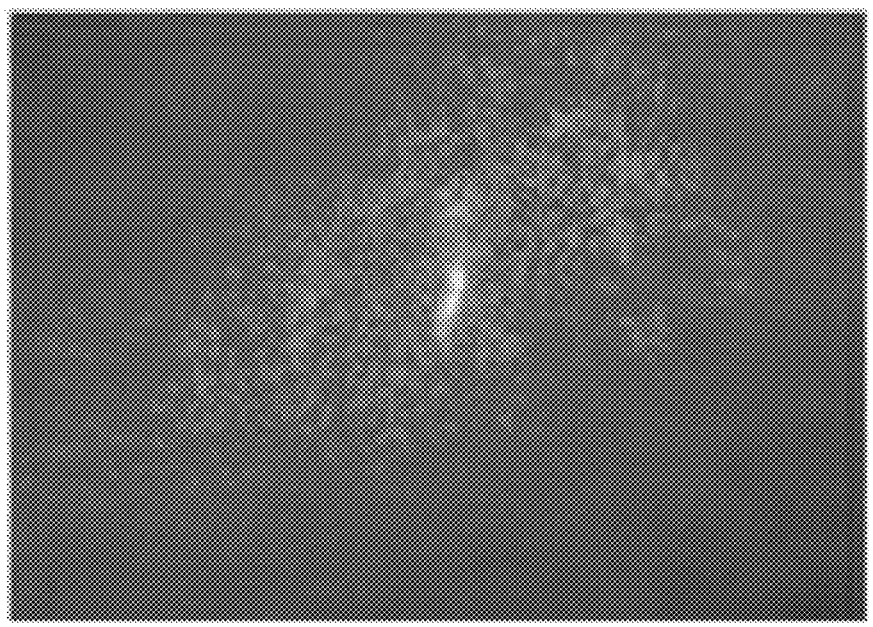
FIG. 6(b) is a speckle intensity pattern generated by a QR code with a phase mask made of tape and a plastic bag.

FIG. 6(a) shows an example of the speckle intensity pattern of the QR code without a phase mask illuminated by a HeNe laser. FIG. 6(b) depicts the speckle intensity pattern of the QR code shown in FIG. 4(a).

The speckle intensity pattern of each individual point on the QR code can be modeled as a negative exponential distribution. Thus, the camera recorded speckle intensity pattern can be modeled as a sum of independent negative exponential distributions which is a gamma distribution defined as [39],[42],[43]:

$$\Gamma\left(I; n_o, \frac{n_o}{\langle I \rangle}\right) = \left(\frac{n_o}{\langle I \rangle}\right)^{n_o} \frac{I^{n_o-1}\exp(-In_o/\langle I \rangle)}{\Gamma(n_o)}, \quad [5]$$

where <I> denotes the mean ensemble, I represents the speckle intensity pattern data points and $n_o$ is the number of independent correlation cells (speckles) within the scanning aperture and chosen so that the variance of the approximate and exact distributions are equal: $n_o = \langle I \rangle^2/\sigma_b^2$, where $\sigma_b$ is the standard deviation of the intensity fluctuation relative to the mean intensity.

The likelihood ratio test [44] can be used for classification between a true and false class speckle intensity pattern. Let $H_o$ be the null hypothesis representing the true class object and $H_1$ be the alternative hypothesis representing the false class object. The log-likelihood function of Eq. (5) is:

$$\log[l(\theta)] = \quad [6]$$
$$Nn_o\log\left(\frac{n_o}{\langle I \rangle}\right) + (n_o-1)\sum_{j=1}^{N}\log(I_j) - N\log[\Gamma(n_o)] - \frac{n_o}{\langle I \rangle}\sum_{j=1}^{N}I_j,$$

where θ represents the distribution parameters and N is the total number of $I_j$.

The log-likelihood ratio can be written as:

$$\log[l(\theta_o)] - \log[l(\theta_1)] \underset{H_1}{\overset{H_o}{\gtrless}} 0, \quad [7]$$

where θ and $\theta_1$ represent the true and false class distribution parameters, respectively.

Using the likelihood ratio test [Eq. (7)] with true and false class images shown in FIG. 5(b) and FIG. 5(a), respectively, a log-likelihood difference of 20,682 was calculated indicating that the test favors the true class and thus can potentially be used for phase mask authentication.

While the invention has been described with reference to preferred embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein.

What is claimed:

1. A method for optical security, tagging and authentication, the method comprising the steps of:
   storing image data in an ID tag;
   generating phase encoded image data by applying phase encoding to the image data;
   generating encrypted image data by multiplying the phase encoded image data with a first type of phase mask that is calculated based on a predefined function;
   producing photon-limited amplitude image data by applying photon-counting to amplitude data of the encrypted image data;
   generating compressed image data by iteratively compressing the photon-limited amplitude image data;
   inputting the compressed image data in an optically encoded object that comprises a QR code;
   combining the QR code with a second type of phase mask, wherein the second type of phase mask is a physical phase mask that includes at least one of a thick phase mask or a 3D code; and
   verifying authenticity of the QR code by examining the QR code with the second type of phase mask.

2. The method of claim 1, wherein photon-counting includes a technique that follows the Poisson distribution.

3. The method of claim 1, wherein a synthetic, natural or physical signature is stored in an identification tag associated with the image data.

4. The method of claim 1, wherein encrypting includes full-phase double-random-phase encryption.

5. The method of claim 1, wherein compressing includes Huffman coding.

6. The method of claim 1, further comprising:
   scanning the QR code;
   verifying the QR code by examining the speckle signature generated by the second type of phase mask using statistical analysis;
   decompressing the compressed image data stored in the QR code, wherein decompressing the compressed image data generates a resultant encrypted image data;
   generating decrypted image data by decrypting the resultant encrypted image data; and
   authenticating the decrypted image data using a classification algorithm by verifying the decrypted image data against a primary image for authentication.

7. The method of claim 1, further comprising scanning the QR code by a QR code scanner.

8. The method of claim 1, wherein the image data is encrypted, compressed and stored in the QR code without requiring the use of the world wide web.

9. The method of claim 6, further comprising using one or more keys to decrypt the resultant encrypted image data.

10. The method of claim 6, further comprising using a nonlinear correlation filter image recognition algorithm to verify the decrypted image data against a primary image for authentication.

11. An optical security, tagging and authentication system, the system comprising:
an integrated circuit configured to:
contain an ID tag storing image data;
generate a phase encoded image data by applying phase encoding to the image data;
generate encrypted image data by multiplying the phase encoded image data with a first type of phase mask that is calculated based on a predefined function;
produce photon-limited amplitude image data by applying photon-counting to amplitude data of the encrypted image data;
generate compressed image data by iteratively compressing the photon-limited amplitude image data;
input the compressed image data in an optically encoded object that comprises a QR code;
combine the QR code with a second type of phase mask, wherein the second type of phase mask is a physical phase mask that includes at least one of a thick phase mask or a 3D code; and
verify authenticity of the QR code by examining the QR code with the second type of phase mask.

12. The system of claim 11, wherein Huffman coding is used to iteratively compress the photon-limited amplitude image data.

13. The system of claim 11, further comprising a mobile device including a camera, configured to:
scan the compressed image data;
verify the QR code by examining the speckle signature generated by the second type of phase mask using statistical analysis;
decompress the compressed image data input in the QR code, wherein decompressing the compressed image data generates a resultant encrypted image data;
generate image data by decrypting the resultant encrypted image data; and
authenticate the image data using a classification algorithm by verifying the decrypted image data against a primary image for authentication.

14. The system in claim 13, wherein a mobile device uses the camera to scan the QR code.

15. The system of claim 13, wherein at least one key is used to decrypt the resultant encrypted image data.

16. The system of claim 13, wherein a nonlinear correlation filter image recognition algorithm to is used to verify the image data against a primary image for authentication.

17. The method of claim 6, wherein the speckle signature is associated with surface roughness of the object to be authenticated.

* * * * *